April 21, 1964  E. D. VAUGHAN, JR  3,130,024
APPARATUS FOR SEPARATING FOREIGN MATTER FROM AIR
Filed July 21, 1960  2 Sheets-Sheet 1
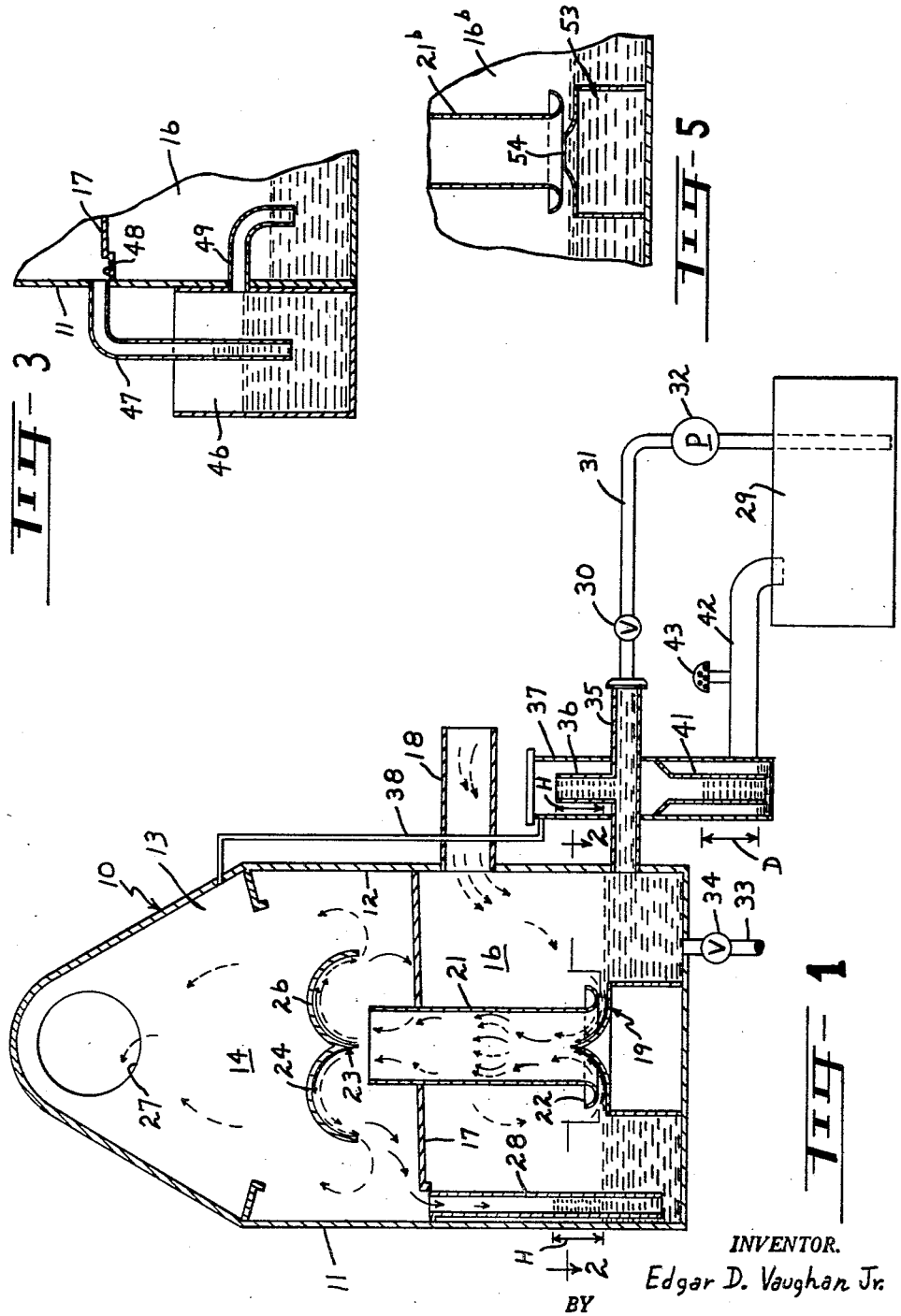
INVENTOR.
Edgar D. Vaughan Jr.
BY
Jennings Carter & Thompson
Attorneys April 21, 1964  E. D. VAUGHAN, JR  3,130,024
APPARATUS FOR SEPARATING FOREIGN MATTER FROM AIR
Filed July 21, 1960  2 Sheets-Sheet 2
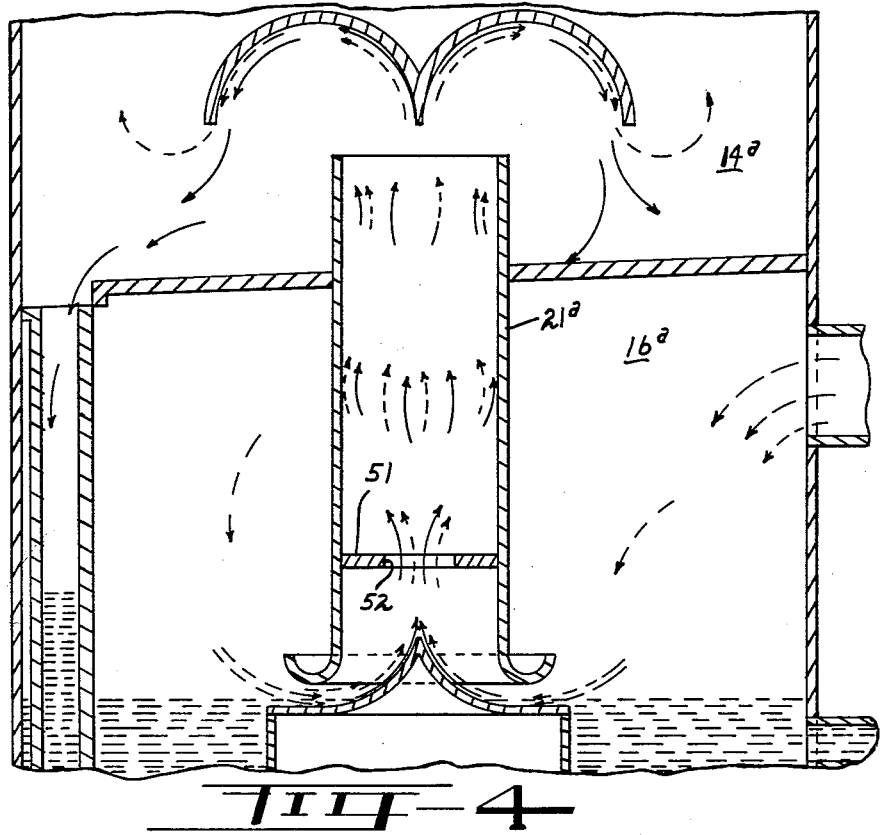
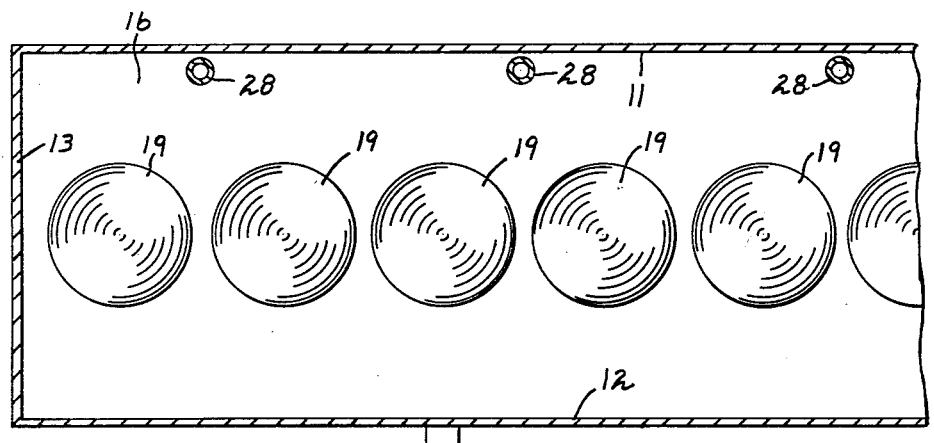
INVENTOR.
Edgar D. Vaughan Jr.
BY
Jennings, Carter & Thompson
Attorneys United States Patent Office 3,130,024
Patented Apr. 21, 1964

3,130,024
APPARATUS FOR SEPARATING FOREIGN MATTER FROM AIR
Edgar D. Vaughan, Jr., Birmingham, Ala., assignor to The Fly Ash Arrestor Corporation, a corporation of Alabama
Filed July 21, 1960, Ser. No. 44,409
6 Claims. (Cl. 55—227)

This invention relates to apparatus for separating foreign matter from air and more particularly to such apparatus in which air laden with foreign matter is entrained with a liquid and then separated from the liquid leaving a major portion of the foreign matter with the liquid.

The present application is a continuation-in-part application of my co-pending application Serial No. 805,444, filed April 10, 1959, now abandoned, and entitled "Process for Separating Foreign Matter From Air."

Heretofore, in apparatus in which dust laden air has been inspirated upwardly within a tube or the like while entrained with a liquid, the surface beneath the tube on which the liquid has been positioned has been flat. This flat surface has caused a swirling vortex of air and liquid adjacent the lower end of the tube as the air has not been directed upwardly into the tube by the flat surface. The swirling motion is undesirable as water is thrown against the inner surface of the tube which decreases the efficiency of the apparatus. Further, part of the swirling stream of air and liquid tended to move laterally over the upper edges of the tube instead of moving directly upwardly. This has tended to make more difficult the separation of the air from the entrained liquid.

The present invention provides a baffle adjacent the lower end of the tube to direct the stream of air and foreign matter in an arcuate path from a generally horizontal path upwardly into the tube while the air is entrained with a thin layer of liquid maintained on the baffle whereby the stream of air and entrained liquid is inspirated up the tube in a vertical direction without creating a swirling motion. The stream of air and liquid tends to gather at the center of the baffle and as it moves upwardly within the tube it disperses outwardly against the sides of the tube so that a substantially uniform distribution of the stream is obtained within the tube. This provides a relatively high efficiency and allows the volume of liquid to be controlled accurately.

It is an object of this invention to provide a baffle beneath the lower end of a tube connecting clean and dirty air compartments through which air and entrained liquid are inspirated which baffle is curved upwardly to direct the flow of air and liquid between the baffle and the lower end of the tube upwardly through the tube in a generally vertical direction without any substantial swirling motion. A thin layer of liquid is maintained on the upper surface of the baffle whereby the air is easily entrained with the liquid.

A further object of my invention is to provide means to maintain the level of liquid on the baffle beneath the tube which means is controlled by the pressure differential between clean air and dirty air compartments with the liquid level fluctuating depending on the difference in pressure between the two compartments.

Briefly described, my apparatus comprises separate clean air and dirty air compartments connected by a vertically directed tube with an upwardly curved baffle adjacent the lower end of the tube, and means maintaining a thin layer of water on the curved surface of the baffle and beneath the lower end of the tube thereby defining a restricted air passage at the lower end of the tube. Water is inspirated up the tube and entrains dust laden air, wetting the dust so that it is separated from the air stream. When the dust laden air passes along the upper surface of the thin water layer in the baffle, the water is stirred up by the air and atomized into small particles which collide with and hold dust particles and the like thereto so that a misty combination of dust and water particles is carried up the tube.

Apparatus embodying features of my invention is shown in the accompanying drawings, forming a part of this application, in which:

FIG. 1 is a sectional view of my apparatus showing separate upper and lower compartments with control means to control the flow of water to the lower compartment;

FIG. 2 is a sectional view taken generally along the line 2—2 of FIG. 1 and showing a plurality of cone-shaped baffles which direct the flow of air and entrained liquid upwardly in a generally vertical direction through a tube connecting the upper and lower compartments;

FIG. 3 is a fragmentary, sectional view of a modification of my invention in which a settling tank is disposed adjacent the lower compartment with a conduit connecting the settling tank to the lower compartment;

FIG. 4 is an enlarged sectional view of a further modification of my invention in which a restriction is provided in the tube connecting the upper and lower air compartments to increase the velocity of the stream of air and entrained liquid thereat; and, FIG. 5 is a fragmentary, sectional view of another modification of the invention in which a cone-shaped baffle adjacent the lower end of the tube connecting the upper and lower compartments is truncated to form an opening therein.

Referring now to FIGS. 1 and 2 in which an embodiment of my apparatus for circulating and removing foreign matter from air is shown, an elongated generally rectangular casing is indicated generally by the numeral 10. Casing 10 comprises side walls 11 and 12 connected by end walls 13. An upper clean air compartment is indicated by the numeral 14 and a lower dirty air compartment is indicated by numeral 16. A partition 17 separates upper compartment 14 from lower compartment 16 and extends between side walls 11 and 12.

A dirty air inlet is indicated at 18 through which air laden with dust or other foreign matter enters the dirty air compartment 16. A plurality of cone-shaped annular baffles (also see FIG. 2) 19 is positioned on the bottom of lower compartment 16. Water is provided in compartment 16 and the upper surface or level of the water is maintained on the upper curved surface of the cone-shaped baffles 19 so that a thin layer of water is formed on tops of baffles 19.

Tubes 21 with one tube 21 being positioned over each of the baffles 19 are provided and extend upwardly from the lower compartment 16 to the upper clean air compartment 14 through partition 17. The lower ends of tubes 21 are flared outwardly as at 22 so that a smooth throat of a venturi-like passage is formed between ends 22 and baffles 19. Each baffle 19 comprises a downwardly flaring cone-shaped member having a generally horizontal outer circumferential portion mounted beneath and in spaced relation to the lower end of a tube 21 to define an annular, venturi-like passage therebetween.

A divider vane 23 divides the upwardly moving column of water particles and entrained foreign matter between a pair of downwardly curved deflectors 24 and 26. Deflectors 24 and 26 aid in separating the clean air from the dirty water and serve as wetted impingement surfaces for dust particles not in contact with the fine water particles. The inner surfaces of deflectors 24 and 26 are flushed continuously by the upwardly moving column of water particles. A clean air outlet is provided at 27 to remove the clean air after it has been separated from the dirty water. Suction is applied to outlet 27 to remove the clean air from compartment 14.

The air and entrained liquid is directed upwardly in tube 21 by the curved surface of baffles 19 in a generally vertical direction without any substantial swirling motion. The air and liquid tend to consolidate at the apex of the baffles and then disperse as they move upwardly so that a substantially uniform distribution is obtained.

To return the water to the lower compartment 16 from the upper compartment 14, a return conduit 28 connects compartment 14 and 16. Partition 17 is a slanted so that water will flow toward conduit 28. Water or other liquid is supplied to compartment 16 from reservoir 29 through water inlet 35. Pump 32 is provided to pump the liquid from reservoir 29 through conduit 31. A valve 30 is positioned in line 31 to meter the flow of water therethrough. An outlet 33 extends from the bottom of compartment 16 and water flows through outlet 33 to a disposal area. Valve 34 is provided to control the flow of water from compartment 16.

As suction is applied at outlet 27 a negative pressure differential exists between compartments 14 and 16. Control means to control the flow of water to lower compartment 16 is responsive to this pressure differential and the volume of water to lower compartment 16 is delivered in accordance with the pressure differential between compartments 14 and 16. The control means comprises a weir 36 which is enclosed by a housing 37 to close weir 36 to atmospheric pressure. A vent line 38 extends between compartment 14 and housing 37 and thus weir 36 is exposed to the pressure in compartment 14. The difference in height H between the surface of liquid in compartment 16 and the height of liquid in overflow weir 36 is equal to the negative pressure differential between compartments 14 and 16. Also, the height H in conduit 28 is equal to the negative pressure differential between compartments 14 and 16. Water overflowing weir 36 is received in the bottom of casing 37 through conduit 41. Return line 42 extends from housing 37 to reservoir 29 and is vented to atmospheric pressure through vent 43. The height of liquid in conduit 41 is the pressure differential between atmospheric pressure and upper clean air chamber 14. This is denoted by the numeral D.

When there is a decrease of volume of air and water in upper chamber 14, a drop in the negative pressure differential between compartments 14 and 16 is effected. Thus, the height of liquid in overflow weir 36 decreases below the level of the upper end of weir 36. This results in the liquid being furnished through supply line 31 being received entirely in the lower compartment 16. Thus, the level of liquid rises in compartment 16 and the space between the upper surface of the water in compartment 16 and the lower end of the tube is decreased. This decrease in space between the lower end of tube 21 and the surface of the liquid causes increased resistance which increases the negative pressure differential between compartments 14 and 16 thereby raising the water level in weir 36 until it overflows.

The water which overflows weir 36 is returned to reservoir 29 in a clean condition since dirty or contaminated water in compartment 16 does not flow outwardly therefrom through conduit 31. Thus, the water overflowing weir 36 can be reused.

In operation, air laden with dust or other foreign matter is conveyed through inlet 18 into the dirty air compartment 16 as indicated by the dotted arrows. The outlet 27 for the clean air creates a suction or vacuum and an updraft is formed in the tube 21 to provide a venturi-like passage. A thin layer of water is formed on the upper surface of the cone-shaped baffles 19 and as the air moves between the lower curved ends 22 of tubes 21 and baffles 19, the thin layer of water on baffles 19 is sheared and formed into a spray or mist of fine water particles. The baffles 19 direct the air and water upwardly through tubes 21 in a generally vertical direction. The dust or other foreign matter in the dirty air collides with and is held by the fine particles of water and the mist-like stream of water with the dirty air and dust particles entrained therein moves upwardly within tubes 21.

Upon reaching the upper ends of tubes 21, the divider 23 divides the upwardly moving stream of air, dust and fine water particles into two portions. The stream is deflected downwardly by the deflectors 24 and 26. The water particles with the dust and foreign matter entrained therein are heavier than the air and are deflected downwardly onto the partition 17. The lighter air particles are not affected as much by the downward deflection as the heavier water particles and separate from the water to escape into the low pressure area of the clean air compartment 14 and to move therefrom through outlet 27.

The water with the dust particles therein flows downwardly through outlet 28 to compartment 16 where it may be reused. The heavier particles settle to the bottom of compartment 16 and are removed through outlet 33. Thus, a continuous cycle of operation is provided by my apparatus. A predetermined or metered volume of water is aspirated with the air and dust particles and only the layer of water on top of the baffles 19 is divided into a mist like stream which is carried upwardly within tubes 21 by the pressure differential between compartments 14 and 16.

Referring to FIG. 3, a modification of my invention is shown in which settling tank 46 is positioned adjacent side wall 11, and outlet 47 thereto from upper clean air compartment 14 extends beneath the level of the water or liquid therein. A depressed or lower section 48 is provided adjacent the inlet end of outlet pipe 47 so that dirty water collected on top of partition 17 will flow downwardly into the recessed section 48 into outlet pipe 47. As the lower end of outlet pipe 47 extends beneath the water level, foreign matter in the water settles and the cleaner water on top is conveyed by an overflow return pipe 49 to the lower dirty air compartment 16 beneath the surface of the water therein.

In FIG. 4, I show a modification of my apparatus comprising an upper clean air compartment 14$^a$ and a lower dirty air compartment 16$^a$ with tubes 21$^a$ extending between the compartments 14$^a$ and 16$^a$. In each of the tubes 21$^a$ a restriction 51 having a central opening 52 is provided. The restriction 51 increases the velocity of the upwardly moving stream of air and entrained water particles adjacent the lower end of the tubes 21$^a$ by providing a relatively sharp drop in pressure above restriction 51. The volume rating of the apparatus does not change and the pressure differential between the upper compartment 14$^a$ and the lower compartment 16$^a$ may be varied by changing the diameter of the opening 52. The operation of the apparatus shown in FIG. 4 is similar to that shown in FIGS. 1 and 2 except for the above mentioned restriction.

Referring now to FIG. 5 in which a further modification of my apparatus is shown, the lower dirty air compartment is indicated by the numeral 16$^b$ and the tube leading upwardly from compartment 16$^b$ is indicated by the numeral 21$^b$. A cone-shaped baffle 53 is provided adjacent the lower end of tube 21$^b$ and is truncated to provide a central opening 54 therein. By this arrangement, the lower air pressure within tube 21$^b$ creates a standing head of water above the opening 54 which is inspirated up tube 21$^b$ along with the layer of water on top of the baffles 53. Thus, an increased volume of water is inspirated by the embodiment shown in FIG. 5. Except for the baffle 53, the other features in the embodiment of FIG. 5 are similar to the embodiment of FIGS. 1–2.

From the foregoing, it will be understood that I have provided apparatus having separate clean air and dirty air compartments connected by a vertically directed tube with a curved cone-shaped baffle adjacent the lower end of the tube. A thin layer of water is formed on the curved upper surface of the baffle immediately below the tube and as the air passes between the upper surface of the water and the tube it is directed upwardly along with atomized particles of water that hold dust or other foreign matter in the air. By changing the direction of the air and entrained particles, the stream tends to consolidate adjacent the vortex or apex of the cone-shaped baffle and disperses outwardly from the vortex as the stream of air, dust and water particles moves upwardly within the tube so that a substantially uniform distribution is obtained in the tube. The curved baffle directs the stream upwardly in a generally vertical direction and no substantial swirling motion is obtained. Further, control means to control the level of the water in the lower compartment is provided which is operable responsive to the differential in pressure between the upper and lower compartments. Upon a decrease in volume of the air and entrained liquid, a drop in pressure occurs which causes an increased flow of liquid into the lower compartment. A rise in the level of water in compartment 16 decreases the space between the lower end of tube 21 and the surface of the water which increases the static resistance thereby to increase the differential in pressure between compartments 14 and 16. When this occurs, the water in overflow weir 36 raises to overflow position and the water level is maintained by my control means responsive to the differential in pressure. While I have indicated the liquid as being water, other liquids such as solutions of water and other elements may be employed effectively.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. Apparatus for mixing a liquid and a gas and then separating them from each other comprising:
    (a) a casing,
    (b) a partition dividing the casing into separate upper and lower compartments,
    (c) an upwardly directed tube communicating the lower compartment with the upper compartment,
    (d) a downwardly flaring cone-shaped baffle substantially concentric with the tube and having a generally horizontal outer circumferential portion beneath and in spaced relation to the lower end of said tube to define an annular venturi-like passage therebetween,
    (e) means to maintain liquid in said lower compartment and to maintain a relatively thin layer of liquid on the downwardly flaring surface of said baffle adjacent and in spaced relation to the lower end of said tube to define a passageway for gas between said layer of liquid and the lower end of said tube.
    (f) means to introduce a gas into said lower compartment above the level of the liquid therein,
    (g) means in communication with said upper compartment disposed to withdraw gas therefrom at a rate to draw gas into said venturi-like passageway at a velocity to break up said thin layer of liquid on the baffle into fine particles which are mixed with the gas and at a velocity to convey the mixture thus formed upwardly through said tube to said upper compartment in a generally rectilinear direction without any substantial swirling motion, and
    (h) means in said upper compartment to separate the gas from the liquid.

2. Apparatus as defined in claim 1 in which the baffle is truncated to define an opening in the top of said baffle beneath said tube.

3. Apparatus as defined in claim 1 in which a restriction is provided in said tube above said baffle to increase the velocity of the upwardly moving mixture of gas and liquid.

4. Apparatus as defined in claim 1 in which the means maintaining a relatively thin layer of liquid on the downwardly flaring surface of the baffle comprises:
    (a) a liquid reservoir,
    (b) a first conduit communicating said reservoir with said lower compartment,
    (c) means to convey liquid from said reservoir to said lower compartment,
    (d) an enclosed overflow weir in said first conduit being exposed to the pressure in said upper compartment and closed to atmospheric pressure,
    (e) a return conduit in position to return liquid flowing over said weir to said reservoir, and
    (f) the height of liquid in said weir being responsive to the pressure differential between the upper and lower compartments whereby a decrease in the liquid level in the weir results in an increased volume of liquid flow to the lower compartment.

5. Apparatus for mixing a liquid and a gas and then separating them from each other comprising:
    (a) a casing,
    (b) a partition dividing the casing into separate upper and lower compartments,
    (c) an upwardly directed tube communicating the lower compartment with the upper compartment,
    (d) a downwardly flaring cone-shaped baffle substantially concentric with the tube and having a generally horizontal outer circumferential portion beneath and in spaced relation to the lower end of said tube to define an annular venturi-like passage therebetween,
    (e) means to maintain liquid in said lower compartment and to maintain a relatively thin layer of liquid on the downwardly flaring surface of said baffle adjacent and in spaced relation to the lower end of said tube to define a passageway for gas between said layer of liquid and the lower end of said tube.
    (f) means to introduce a gas into said lower compartment above the level of the liquid therein,
    (g) means in communication with said upper compartment disposed to withdraw gas therefrom at a rate to draw gas into said venturi-like passageway at a velocity to break up said thin layer of liquid on the baffle into fine particles which are mixed with the gas and at a velocity to convey the mixture thus formed upwardly through said tube to said upper compartment in a generally rectilinear direction without any substantial swirling motion,
    (h) a downwardly directed deflector over the upper end of said tube,
    (i) a settling tank for receiving a liquid,
    (j) a conducit communicating said upper compartment with said settling tank in position to convey the liquid collected in said upper compartment to said settling tank, and
    (k) the discharge end of said conduit being adapted to extend below the surface of the liquid in said settling tank.

6. Apparatus for separating dust from an air stream comprising:
    (a) a casing,
    (b) a partition dividing said casing into separate upper clean air and lower dirty air compartments,
    (c) an upwardly directed tube communicating said lower dirty air compartment with said upper clean air compartment,
    (d) a downwardly flaring cone-shaped baffle substantially concentric with the tube and having a generally horizontal outer circumferential portion beneath and in spaced relation to the lower end of said tube to define an annular venturi-like passageway therebetween,
    (e) means to maintain liquid in said lower dirty air compartment and to maintain a relatively thin layer of liquid on the downwardly flaring surface of said baffle adjacent and in spaced relation to the lower end of said tube to define a passageway for air between said layer of liquid and the lower end of said tube, (*f*) means to introduce dust laden air into said lower dirty air compartment above the level of the liquid therein, (*g*) means in communication with said upper clean air compartment disposed to withdraw air therefrom at a rate to draw dust laden air into said venturi-like passageway at a velocity to break up said thin layer of liquid on the baffle into fine particles which are mixed with dust laden air and at a velocity to convey the mixture thus formed upwardly through said tube to said upper dirty air compartment in a generally rectilinear direction without any substantial swirling motion, and (*h*) means in said upper dirty air compartment to separate the air from the liquid.

References Cited in the file of this patent

UNITED STATES PATENTS

| | | |
|---|---|---|
| 1,363,859 | Fetters et al. | Dec. 28, 1920 |
| 1,897,372 | Garner et al. | Feb. 14, 1933 |
| 1,920,437 | Sillers | Aug. 1, 1933 |
| 1,960,260 | Acton | May 29, 1934 |
| 2,230,453 | Fitch | Feb. 4, 1941 |
| 2,233,019 | Linderman | Feb. 25, 1941 |
| 2,379,396 | Ziliotto | June 26, 1945 |
| 2,397,525 | Bennett | Apr. 2, 1946 |
| 2,403,545 | Nutting | July 9, 1946 |
| 2,551,890 | Love | May 8, 1951 |
| 2,790,506 | Van Vactor | Apr. 30, 1957 |
| 2,792,905 | Forrest | May 21, 1957 |
| 2,871,973 | Roujob | Feb. 3, 1959 |

FOREIGN PATENTS

| | | |
|---|---|---|
| 55,370 | Netherlands | Apr. 15, 1946 |
| 574,128 | Great Britain | Dec. 21, 1945 |
| 873,733 | France | Apr. 7, 1942 |